UNITED STATES PATENT OFFICE.

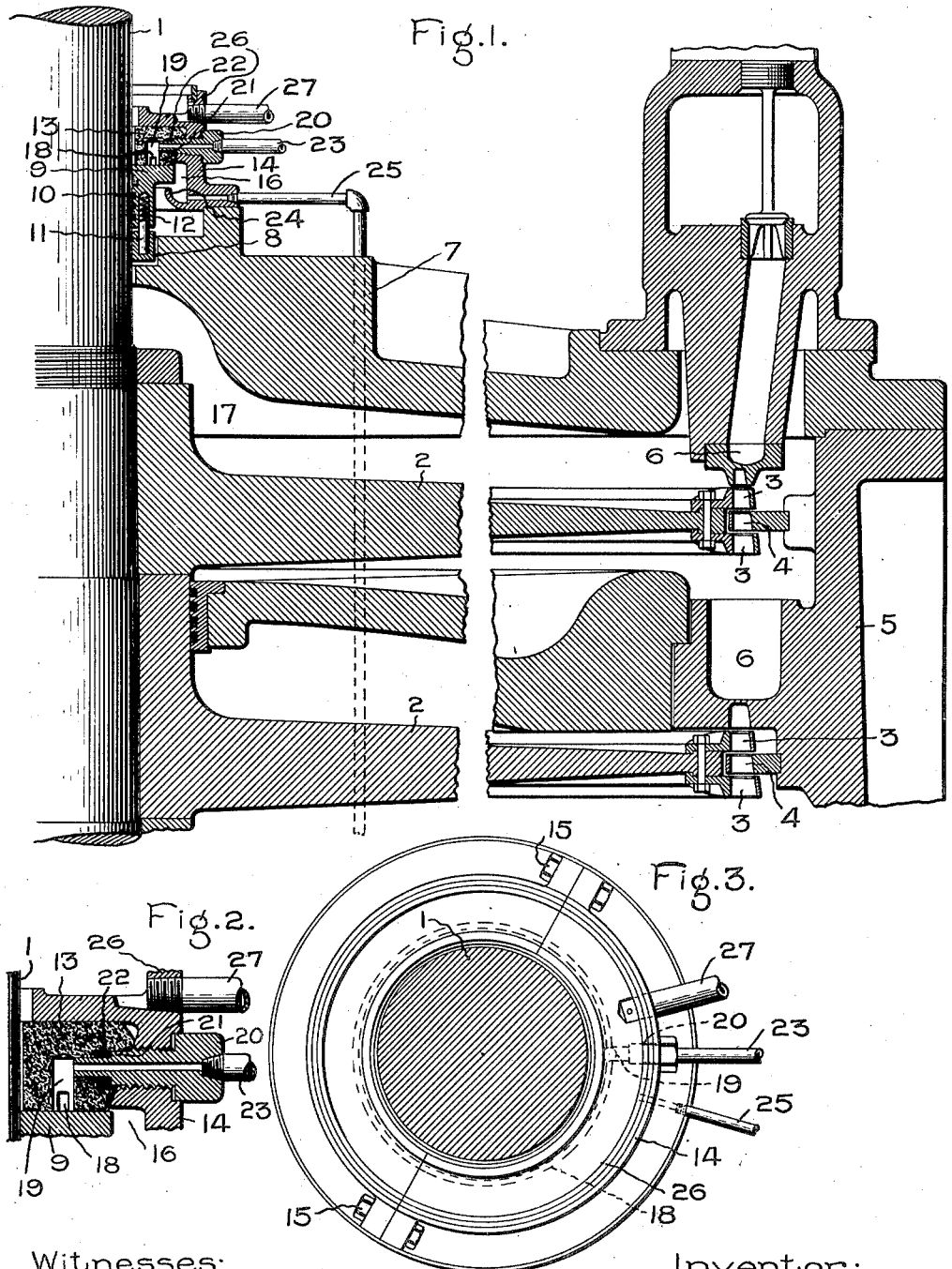

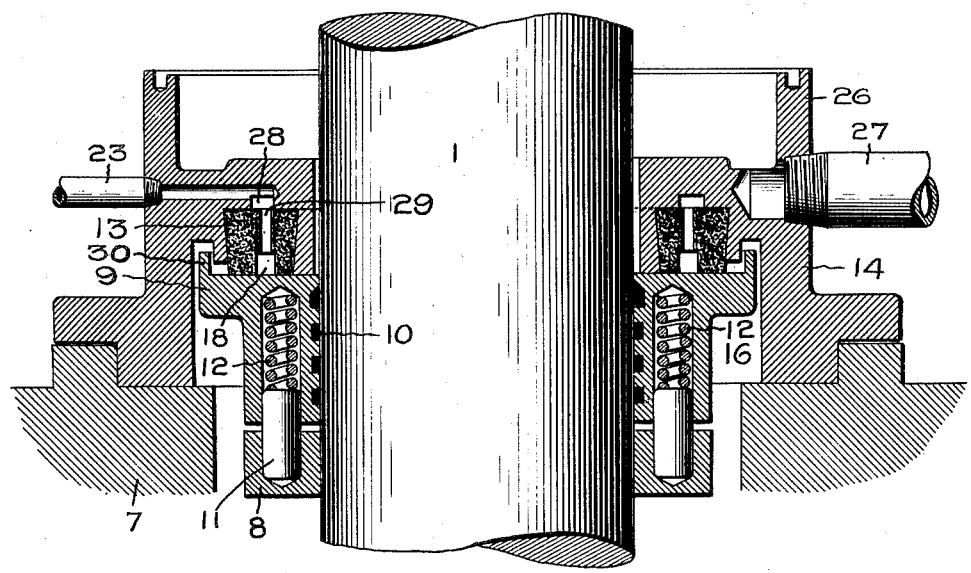
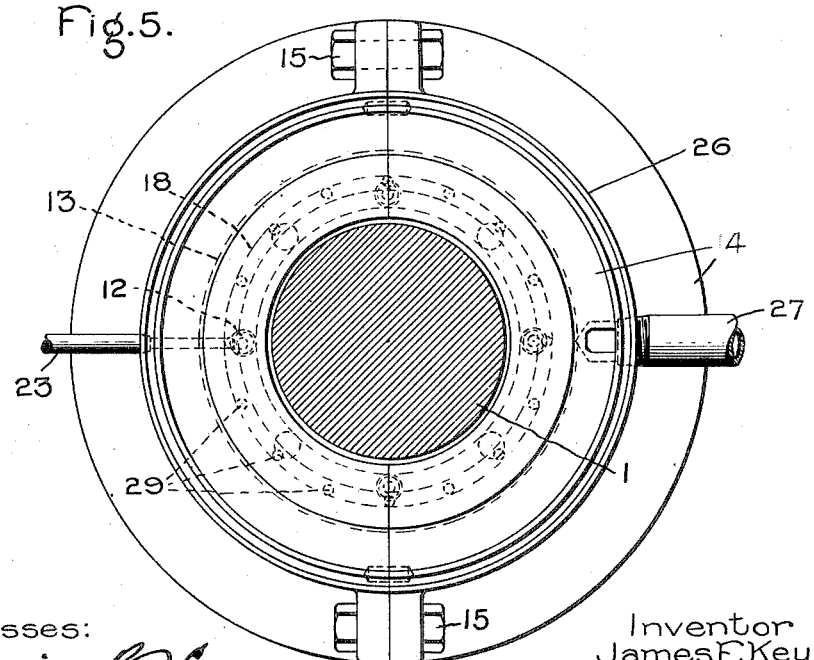

JAMES F. KEY, OF SCHENECTADY, NEW YORK, ASSIGNOR TO GENERAL ELECTRIC COMPANY, A CORPORATION OF NEW YORK.

HYDRAULIC SHAFT-PACKING FOR TURBINES.

No. 811,642.      Specification of Letters Patent.      Patented Feb. 6, 1906.

Application filed July 20, 1904. Serial No. 217,325.

*To all whom it may concern:*

Be it known that I, JAMES F. KEY, a citizen of the United States, residing at Schenectady, in the county of Schenectady and State of New York, have invented certain new and useful Improvements in Hydraulic Shaft-Packings for Turbines, of which the following is a specification.

This invention relates to packing for rotating shafts; and its object is to provide a simple and efficient packing for maintaining a tight joint under the pressure of an elastic fluid, such as steam.

The invention is especially applicable to steam-turbines, but is capable of use in other connections.

It consists in the combination, with a packing-ring, of means for supplying a liquid under pressure to the rubbing-surfaces in order to lubricate them and also balance the pressure of the elastic fluid which the packing is keeping confined.

In the accompanying drawings, Figure 1 is a longitudinal section of a portion of a steam-turbine equipped with my improved packing. Fig. 2 is an enlarged view of the grooved ring or plug. Fig. 3 is a cross-section of the shaft, showing the packing in plan. Fig. 4 is a longitudinal section of a modification, and Fig. 5 is a plan view of the same.

The shaft 1 is shown as standing in a vertical position, but the packing is applicable to shafts in horizontal and other positions. The bucket-wheels 2 are provided with buckets 3, coöperating with intermediates 4, supported by the casing 5 and taking steam from the nozzles 6. The top or head 7 of the casing has a central opening for the shaft. Just outside the head a shoulder is formed on the shaft, preferably by securing thereto a collar 8, and beyond this is a packing-ring 9, longitudinally movable on the shaft and having internal grooves filled with soft packing 10, to make a fluid-tight joint between the ring and the shaft. The ring is compelled to rotate with the shaft, preferably by means of studs 11, fixed in the collar 8 and entering sockets in the ring. Means are provided for urging the packing-ring lengthwise on the shaft, consisting, preferably, of springs 12, housed in the sockets in the ring and abutting at one end on the inner ends of the sockets and at the other on the studs. The outer face of the ring 9 is faced off smooth in a plane of revolution and is forced by the springs against a stationary packing-ring 13, of any suitable material, preferably carbon. A casing 14, made in halves fastened together by bolts 15, tightly clamps the ring 13, the casing being undercut and the ring beveled to fit. The casing is secured to the head 7 by a steam-tight joint, so that a space 16 is formed communicating with the first-stage chamber 17 of the turbine and inclosing the joint between the two packing-rings.

The packing-ring 13 has a groove 18 in its working face, communicating by a cavity 19 with a tubular plug 20, screwed through the side of the casing 14 into the ring. To insure a tight joint, a shoulder 21 on the plug may bear on a gasket 22, seated in a socket in the ring 13. A pipe 23 conveys water under pressure to the plug 20 and the groove 18. The pressure is made substantially equal to the steam-pressure in the chamber 17 and space 16—say, fifty to sixty pounds to the square inch. Should any water leak into the space 16, it is caught by a curved flange 24 on the inside of the casing 14 and drained off by a pipe 25, which communicates with the last stage of the turbine or with the condenser, in order to maintain a forced drainage and avoid flooding the wheel. Any water which leaks through to the shaft and out past the carbon ring is caught by a flange 26 on the end of the casing and led away through a drain-pipe 27.

The invention is capable of a great variety of modifications, one of which is shown on Sheet 2 of the drawings. The water is fed into an annular groove 28 in the casing, from which it passes through a plurality of ports 29 into the groove 18 of the stationary packing-ring. If this is made of hard wood, it can be compressed into a dovetailed groove in the casing; but if a carbon ring is used the inner wall of the groove must be cut away on the dotted line in the plane of the back of the ring in order to permit the segments of the ring to be slid into the halves of the casing, the same as in the construction shown in Fig. 1. The inner drip-flange is omitted and the rotatable packing-ring has a flange 30 to retain a small quantity of leakage water and insure good lubrication of the working faces of the packing-rings.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination with a rotatable shaft, of a packing therefor comprising two packing-rings, one of which is rotatable, and means for yieldingly supporting one of them.

2. The combination with a rotatable shaft, of a packing therefor comprising two packing-rings, one stationary and the other rotating with the shaft, and means for causing one to bear with a yielding pressure on the other.

3. The combination with a rotatable shaft, of a packing therefor comprising two packing-rings, and means for rendering one of them yieldingly movable lengthwise of the shaft.

4. The combination with a rotatable shaft, of a packing therefor comprising a stationary packing-ring, a packing-ring bearing against the other and rotating with the shaft, and a support for said rotating ring yielding lengthwise of the shaft.

5. The combination with a rotatable shaft, of a packing-ring movable lengthwise thereon, a collar fixed on the shaft, springs between said collar and ring, and a stationary packing-ring bearing against the movable ring.

6. The combination with a rotatable shaft, of a collar fixed thereon, studs in said collar, a packing-ring movable lengthwise on said shaft and having sockets receiving said studs, springs in said sockets abutting on said studs, and a stationary packing-ring bearing on the movable ring.

7. The combination with a rotatable shaft, of a packing therefor comprising two packing-rings, one of which is rotatable, and means for introducing liquid under pressure between said rings.

8. The combination with a rotatable shaft, of a packing therefor comprising a stationary packing-ring, a rotatable packing-ring coöperating therewith, and a pipe conveying water under pressure to the joint between said rings.

9. The combination with a rotatable shaft, of a packing therefor comprising a stationary packing-ring having a grooved working face, a water-pipe communicating with the groove, and a rotatable packing-ring coöperating with the other.

10. The combination with a rotatable shaft, of a packing therefor comprising a stationary packing-ring having a grooved working face, a water-pipe communicating with the groove, a rotatable packing-ring, and a yielding support therefor on said shaft.

11. The combination with an elastic-fluid turbine, of a casing concentric with the shaft and communicating with the turbine-casing, a packing-ring in said casing having a groove in its working face, a water-pipe communicating with said groove, a rotatable packing-ring on the shaft, and means for draining off the leakage water.

12. The combination with an elastic-fluid turbine, of a casing concentric with the shaft and communicating with the steam-space, a carbon packing-ring in said casing having a groove in its working face, a tubular plug screwed through said casing and into said ring, a yielding packing-ring rotating with the shaft, an internal flange on said casing, and a drain-pipe from said flange.

In witness whereof I have hereunto set my hand this 19th day of July, 1904.

JAMES F. KEY.

Witnesses:
BENJAMIN B. HULL,
HELEN ORFORD.